United States Patent
Brei et al.

(10) Patent No.: US 11,702,224 B2
(45) Date of Patent: Jul. 18, 2023

(54) LIGHTNING STRIKE PROTECTION

(71) Applicant: The Boeing Company, Chicago, IL (US)

(72) Inventors: Mark R. Brei, Ladson, SC (US); Kevin D. Gordon, Summerville, SC (US); Thomas G. Lawton, Ladson, SC (US); Anthony M. Westren, Mount Pleasant, SC (US); Meredith P. Nix, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 71 days.

(21) Appl. No.: 16/526,780

(22) Filed: Jul. 30, 2019

(65) Prior Publication Data

US 2021/0031942 A1  Feb. 4, 2021

(51) Int. Cl.
*B64D 45/02* (2006.01)
*B32B 15/092* (2006.01)
(Continued)

(52) U.S. Cl.
CPC ............ *B64D 45/02* (2013.01); *B32B 15/092* (2013.01); *B32B 15/14* (2013.01); *B32B 15/20* (2013.01); *B32B 2605/18* (2013.01)

(58) Field of Classification Search
CPC ....... B64D 45/02; B32B 15/092; B32B 15/14; B32B 15/20; B32B 2605/18; Y02T 50/40; B64C 2001/0072
See application file for complete search history.

(56) References Cited

U.S. PATENT DOCUMENTS 8,178,606 B2   5/2012  Sang et al.
8,709,189 B2   4/2014  Schaaf et al.
(Continued)

FOREIGN PATENT DOCUMENTS

CN   107825810 A   *   3/2018
EP   2838702         1/2014
(Continued)

OTHER PUBLICATIONS

Machine Translation of CN 107825810 A (Year: 2018).*
Extended European Search Report dated Nov. 30, 2020 in corresponding European Application No. 20179570.5, 10 pages.

*Primary Examiner* — Callie E Shosho
*Assistant Examiner* — Bethany M Miller
(74) *Attorney, Agent, or Firm* — MH2 Technology Law Group LLP (57) ABSTRACT

The present disclosure is directed to an exterior surface protective layer for protecting a composite structure from environmental conditions including: at least one curable film; such as at least two curable films, and an electrically conductive material, wherein the electrically conductive material comprises a wire-free electrically conductive material, and/or an electrically conductive polymer weave, wherein the at least one curable film includes at least one of polyurethane, polyimide, polyester or epoxy upon curing, and wherein a weight of the exterior surface protective layer ranges from about 0.02 pounds per square foot to about 0.1 pounds per square foot. An exterior surface protected composite structure and methods of forming an exterior surface protected composite structure are also provided.

27 Claims, 2 Drawing Sheets

(51) Int. Cl.
 *B32B 15/14* (2006.01)
 *B32B 15/20* (2006.01)

(56) References Cited

U.S. PATENT DOCUMENTS

| | | | |
|---|---|---|---|
| 2009/0258220 A1 | 10/2009 | Schaaf et al. | |
| 2010/0151239 A1* | 6/2010 | Hebert | B32B 7/12 156/60 |
| 2011/0163275 A1 | 7/2011 | Simmons et al. | |
| 2012/0021209 A1* | 1/2012 | Moncur | C08J 5/12 156/60 |
| 2017/0043552 A1* | 2/2017 | Lenzi | B32B 5/08 |
| 2018/0345646 A1 | 12/2018 | Westren et al. | |
| 2018/0346146 A1* | 12/2018 | Sang | B32B 3/266 |
| 2019/0119508 A1* | 4/2019 | Okamoto | H01B 1/24 |
| 2020/0392654 A1* | 12/2020 | Fowler | D06M 11/74 |

FOREIGN PATENT DOCUMENTS

| | | | |
|---|---|---|---|
| EP | 2900468 | 6/2014 | |
| WO | 2018-048705 A2 | 4/2008 | |
| WO | WO-2008048705 A2 * | 4/2008 | B64D 45/02 |
| WO | 2014-011293 A2 | 1/2014 | |
| WO | 2017-088866 A1 | 6/2014 | |

\* cited by examiner

LIGHTNING STRIKE PROTECTION

FIELD

The present disclosure is directed to lightning strike protection for composite parts. The lightning strike protection may also be used to protect a composite part from exposure to environmental conditions or elements including solar radiation, moisture and/or chemicals, such as fuels. The present lightning strike protection is particularly effective for protecting aircraft components.

BACKGROUND

Many components, for example, aircraft components, are constructed of strong but lightweight composite materials that help to minimize the overall weight of, e.g., an aircraft. These composite materials often comprise carbon reinforcement fibers distributed within a polymeric matrix. However, such composite structures, typically, are substantially less electrically conductive than metal structures, and, consequently, are less capable of distributing and dissipating electrical energy resulting from a lightning strike. Accordingly, external surfaces of such composite components often include lightning strike protection that provides a highly conductive electrical path along their external surfaces. Such a conductive path permits the electrical energy associated with a lightning strike to be rapidly dissipated across the protected surface, which helps minimize damage to the surface of, e.g., an aircraft component, at the lightning strike point.

Lightning strike protection for composite structures commonly use an expanded metal screen (mesh), which is embedded in a surface film attached on a composite surface to dissipate the energy incurred by a strike. Though metal screens have proven to be effective for lightning strike protection, such materials can add undesired weight to, e.g., an aircraft. Furthermore, integrating these surfacing films into composite structures may significantly increase labor costs. Moreover, such screens may be susceptible to environmental conditions including moisture, chemicals or repeated changes in ambient temperature, which can lead to cracking, creating a route for corrosion of a composite part. Accordingly, there remains a need for lightning strike protection that is lightweight, may be readily incorporated into a composite structure and which demonstrates resistance to environmental conditions.

SUMMARY

In one aspect, the present disclosure is directed to an exterior surface protective layer for protecting a composite structure from environmental conditions, the exterior surface protective layer including: at least one curable film; and an electrically conductive material, wherein the at least one curable film includes at least one of polyurethane, polyimide, polyester or epoxy upon curing, wherein the electrically conductive material contains a wire-free electrically conductive material, and/or an electrically conductive polymer weave, and wherein a weight of the exterior surface protective layer ranges from about 0.02 pounds per square foot to about 0.1 pounds per square foot.

In some embodiments, the at least one curable film includes at least a first and a second curable film, the electrically conductive material includes an electrically conductive polymer weave disposed between the first and second curable films, and the first and second curable films independently contain at least one of polyurethane, polyimide, polyester or epoxy upon curing, typically, polyurethane.

In another aspect, the present disclosure is directed to an exterior surface protected composite structure including: a composite structure, wherein the composite structure has a surface that may be exposed to environmental conditions; and an exterior surface protective layer, wherein the exterior surface protective layer is adhered to the composite structure surface exposed to environmental conditions, wherein the exterior surface protective layer includes: at least one cured film; and an electrically conductive material, wherein the at least one cured film has at least one of polyurethane, polyimide, polyester or epoxy, wherein the electrically conductive material includes a wire-free electrically conductive material, and/or an electrically conductive polymer weave, and wherein a weight of the exterior surface protective layer ranges from about 0.02 pounds per square foot to about 0.1 pounds per square foot.

In yet another embodiment, the present disclosure is directed a method of forming an exterior surface protected composite structure including: positioning an exterior surface protective layer onto a surface of a composite material, wherein the exterior surface protective layer includes: at least one curable film; and an electrically conductive material; co-curing the exterior surface protective layer and the composite material to form a cured exterior surface protected structure, wherein the at least one curable film comprises at least one of polyurethane, polyimide, polyester or epoxy upon curing, wherein the electrically conductive material has a wire-free electrically conductive material, and/or an electrically conductive polymer weave, wherein a weight of the exterior surface protective layer ranges from about 0.02 pounds per square foot to about 0.1 pounds per square foot, and wherein the exterior surface protective layer may be exposed to environmental conditions.

DETAILED DESCRIPTION

The following description is merely exemplary in nature and is in no way intended to limit the disclosure, its application, or uses.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls. Unless otherwise specified, all percentages and amounts expressed herein and elsewhere in the specification should be understood to refer to percentages by weight. The amounts given are based on the active weight of the material.

For weight amounts and ranges, measurements were taken using an analytical balance. Weights are by weight of total solids unless otherwise indicated. For particle sizes, testing was conducted using a Coulter Counter unless otherwise indicated.

The present inventors have developed a light weight exterior surface protective layer for lightning strike protection of composite structures, such as those used for aircraft components. The exterior surface protective layer, in embodiments, does not require metal screens and/or interwoven wire fabric (IWWF), which can cause cracks in a composite structure due to thermal expansion. Further, the present exterior surface protective layer is resistant to environmental conditions and requires few steps to manufacture, thus reducing labor costs. These and other surprising benefits of the present exterior surface protective layer are further described herein.

Articles

Exterior Surface Protective Layer

Curable Films

The present disclosure is directed to an exterior surface protective layer for protecting a composite structure from exposure to environmental conditions including at least one, such as at least two curable films and an electrically conductive material. As described herein, the electrically conductive material may be incorporated into a curable film of the disclosure or may be formed into a layer and disposed between a first and second curable film.

The phrase "environmental conditions", as used herein, encompasses conditions or elements in an environment due to nature, e.g., electromagnetic energy events, such as lightning strike, electrostatic discharge, and electromagnetic interference; solar radiation including ultraviolet radiation, ozone, humidity, and rain; and/or conditions and/or elements found in an environment that are not due to nature, such as conditions and/or chemicals, including those in an aircraft environment, e.g., extreme heat produced by aircraft engines that is passed on by conduction and radiation to nearby devices, antifreeze, fuel, hydraulic fluid, battery acid, cleaning solutions, etc.

In some embodiments, the at least one curable film of the present disclosure is formed from a curable film composition including a thermosetting resin. Generally, the thermosetting resin includes prepolymers in the form of a soft solid or viscous liquid at room temperature (about 20° C. to about 25° C.), which typically hardens after curing.

"Curing" induces chemical reactions in a curable substance, such as the present curable film composition, resulting in extensive cross-linking between polymer chains to produce an insoluble polymer network. Curing may be performed by processes that include, for example, heating and/or exposure to ultraviolet light. In some embodiments, curing is promoted by high pressure, or mixing with a curing agent or catalyst. The phrase "at least partially cured" as used herein, refers to subjecting a polymerizable composition to curing conditions, wherein reaction of at least a portion of the reactive groups of the composition occurs, to form a solid polymerizate.

Examples of suitable thermosetting resins for use with the curable film composition of the present disclosure include polyester resins, epoxy resins, and polyimide resins, e.g., bismaleimide (BMI) and/or polyetherimides. In more typical embodiments, the thermosetting resins for use with the curable film composition of the present disclosure include at least one polyisocyanate and at least one polyol, which form polyurethane upon curing. The term "polyurethane", as used herein, refers to polymers containing urethane (also known as carbamate) linkages, urea linkages, or combinations thereof, e.g., polyurethane-ureas. Thus, polyurethanes of the disclosure may contain at least urethane linkages and, optionally, urea linkages.

In some embodiments, the curable film composition of the present disclosure comprises an amount of thermosetting resin ranging from about 5 to 100 weight percent (wt. %), such as about 15 to 75 wt. %, such as about 25 to 60 wt. %, on the basis of the total weight of a curable film composition.

In some embodiments, the curable film composition of the present disclosure further comprises non-conductive additives, such as fillers, flow control agents, toughening agents, pigments, stabilizers, (e.g., antioxidants, heat stabilizers, and ultraviolet (UV) stabilizers), curing agents and/or catalysts.

Examples of non-conductive fillers suitable for use with the curable film composition of the present disclosure include ground or precipitated chalks, quartz powder, alumina, dolomite, carbon fibers, glass fibers, polymeric fibers, titanium dioxide, fused silica, carbon black, calcium oxide, calcium magnesium carbonates, barite and, especially, silicate-like fillers of the aluminum magnesium calcium silicate type. Other suitable non-conductive fillers include ceramics and fumed silica. The fillers may be in the form of flakes, powders, fibers, microspheres, or glass balloons, and may be solid or hollow structures. Further discussion of fillers may be found in U.S. Pat. No. 4,980,234, which is herein incorporated by reference in its entirety.

In some embodiments, the fillers may be present in the curable film composition of the present disclosure in an amount ranging from about 0 to 40 wt. % on the basis of the total weight of the curable film composition. In other embodiments, the fillers may be present in a concentration ranging from about 5 to 30 wt. %.

Flow control agents may be employed to modify the rheological properties of the present curable film composition. Examples of suitable flow control agents include fumed silica and metallic powders. The flow control agents may be present in an amount ranging from about 0 to 40 wt. %, more typically, about 0.1 to 10 wt. %, on the basis of the total weight of the composition.

In some embodiments, toughening agents are added to the present curable film compositions to adjust the film rigidity and surface hardness of the film after curing. In certain embodiments, the toughening agents may be polymeric or oligomeric, have glass transition temperatures below 20° C. (more typically below 0° C. or below −30° C. or below −50° C.), and/or have functional groups such as carboxylic acid groups, amino groups and/or hydroxyl groups capable of reacting with other components of the present curable film composition when the composition is cured by heating.

Examples of suitable toughening agents including elastomeric toughening agents, such as carboxylated nitriles (e.g., Nipol 1472, Zeon Chemical, Inc.), carboxylterminated butadiene acrylonitrile (CTBN), carboxyl-terminated polybutadiene (CTB), poly(ether ether ketone) (PEEK) and polyetherketoneketone (PEKK). Further examples of suitable toughening agents are found in U.S. Pat. No. 4,980,234, U.S. Patent Application Publication No. 2008/0188609, and International Patent Publication No. WO 2008/087467, each of which is herein incorporated by reference in its entirety. The concentration of the toughening agents may range from about 5 to 40 wt. % on the basis of the total weight of the composition. In other embodiments, the concentration of the toughening agent may range from about 1 to 30 wt. %.

Pigments may also be added to the present curable film composition for adjusting the color and appearance of the curable film. Suitable pigments include titanium dioxide, carbon black, black pigment, and other color dyes. The pigments may be provided in the form of flakes, powders, fibers, or color concentrate liquid. The total amount of all pigments may range from about 0 to 20 wt. % on the basis of the total weight of the composition.

UV stabilizers may also, optionally, be added to the present curable film composition. In some embodiments, the UV stabilizers include UV absorbers, antioxidants, pigments, blocking agents, and fillers. In some embodiments, the UV stabilizers include butylated hydroxytoluene (BHT), 2-hydroxy-4-methoxy-benzophenone (UV-9), 2,4-Bis(2,4-dimethylphenyl)-6-(2-hydroxy-4-octyloxyphenyl)-1,3,5-triazine, 3,5-Di-te/t-butyl-4-hydroxybenzoic acid, n hexadecyl ester, titanium dioxide, and carbon black. In some embodiments, the UV stabilizers may each be present in an amount ranging from about 0.1 to 5 wt. %, on the basis of the total weight of the composition. In other embodiments, the UV stabilizers may each be present in an amount ranging from about 0.5 to 3 wt. % on the basis of the total weight of the composition.

Examples of suitable curing agents and/or catalysts, which may be added to a curable film composition of the present disclosure include aliphatic and aromatic primary amines, and aliphatic and aromatic tertiary amines. More particularly, amine curing agents and/or catalysts may include dicyandiamide, bisureas (e.g., 2,4-Toluene bis-(dimethyl urea), 4,4'-methylene bis-(phenyl dimethylurea) and 4,4'-diaminodiphenyl sulfone (4,4-DDS). Other suitable curing agents and/or catalysts include boron trifluoride complexes, guanidines, and dicyandiamide. Additional examples of curing agents and/or catalysts may be found in U.S. Pat. No. 4,980,234 and U.S. Patent Application Publication No. 2008/0188609, each of which is herein incorporated by reference in its entirety.

One or more curing agents and/or catalysts may be present in an amount ranging from about 0.1 to 40 wt. % on the basis of the total weight of the curable film composition. In other embodiments, the one or more curing agents and/or catalysts may be present in an amount ranging from about 0.5 to 10 wt. %.

Other suitable additives, which may be included in the curable film composition of the present disclosure, include crosslinkers (e.g., aluminum or melamine crosslinkers), binders, corrosion inhibitors, plasticizers and/or other conventional additives known to those of ordinary skill in the art. In some embodiments, electrically conductive materials are also included in the present curable film composition as described herein.

The at least one curable film of the present disclosure may be formed by adding one or more resins capable of forming a thermosetting polymer as described herein to a mixing vessel. In certain embodiments, non-conductive additives, e.g., one or more non-conductive fillers, flow control agents, pigments, UV stabilizers, curing agents and/or catalysts are also added to the mixing vessel. In certain embodiments, as described herein, one or more electrically conductive materials, such as silver nanoparticles, are further added into the mixing vessel.

In some embodiments, one or more solvents are included in the mixture to promote mixing of the components. Examples of such solvents may include methyl ethyl ketone (MEK), acetone, dimethylacetamide (DMAc), and N-Methylpyrrolidone (NMP).

After adding the above-described components, the curable film composition may be allowed to mix using e.g., a high speed shear mixer. Mixing may be performed until the components are mixed substantially uniformly and the one or more electrically conductive materials, if any, are dispersed uniformly in the curable film composition, e.g., 30 to 80 minutes at a speed of about 1000 to 5000 rotations per minute, for example.

The mixed curable film composition may then subsequently be formed into a curable film by coating using hot-melt coating or solvated film coating processes, for example, as are known in the art. In some embodiments, the at least one curable film of the present disclosure, such as the at least two curable films, may be stored in cold storage in order to inhibit curing, thereby prolonging its useful shelf life.

In some embodiments, at least two curable films are formed from one or more curable film compositions. In such embodiments, the curable films may each comprise the same or different thermosetting resins. In some embodiments, a first and a second curable film each independently comprises at least one of polyurethane, polyimide, polyester or epoxy upon curing. Typically, a first and second curable film each comprises polyurethane upon curing.

Electrically Conductive Materials

In some embodiments, the exterior surface protective layer of the present disclosure comprises an electrically conductive material. As used herein, "electrically conductive" refers to having a high electrical conductivity, typically, at least as high as is characteristic of metals in their metallic state, such as titanium, platinum, copper, aluminum, nickel, silver, gold and the like and/or ICPs, such as polypyrrole, polycarbazole, polyaniline, polyacetylene and polythiophene.

In some embodiments, the electrically conductive materials of the present disclosure are "wire-free." As used herein, a "wire" refers to a continuous metal or metal alloy structure drawn out in the form of a thin flexible filament or rod. Electrically conductive materials comprising wires include metal meshes and interwoven wire fabric (IWWF), wherein wires comprising phosphor bronze, aluminum, copper or other metals or alloys are woven into a cloth, such as a carbon cloth. Filaments coated with metal are also meant to be included in the term "wire."

The term "wire-free" in reference to the electrically conductive materials of the present disclosure encompasses metal and alloys that are not in wire form, e.g., metal-coated particles, metal particles, metal flakes, and/or metal nanoparticles. The term "wire-free" also encompasses electrically conductive materials that are not composed of metal and/or metal alloys having any morphology, such as filaments comprising ICPs, as described herein.

In some embodiments, the wire-free electrically conductive materials of the present disclosure comprise metallic electrically conductive materials, such as metal-coated particles, metal particles and/or metal flakes. In some embodiments, the largest mean dimension of the metal-coated particles, metal particles and/or metal flakes is greater than 1 micrometer (μm), e.g., 1 μm to 250 μm, such as 10 μm to 100 μm, such as 50 μm to 200 μm. In some embodiments, the metal particles and/or metal flakes of the electrically conductive material of the present disclosure comprise silver, gold, nickel, copper, aluminum, alloys thereof and mixtures thereof. Examples of metal-coated particles include metal-coated glass balloons and metal-coated graphite. Examples of metals which may be used as coatings include, silver, gold, nickel, copper, aluminum, alloys thereof and mixtures thereof.

In some embodiments, the metallic wire-free electrically conductive materials of the present disclosure comprise metal nanoparticles. In some embodiments, the largest mean diameter of the nanoparticles may be less than 100 nanometers, such as from about 1 nanometers to about 80 nanometers, such as 10 to 50 nanometers. Metal nanoparticles suitable for use as wire-free electrically conductive materials of the present disclosure include silver, gold, nickel, aluminum, or copper nanoparticles, alloys thereof and mixtures thereof. Typically, silver nanoparticles are employed.

In some embodiments, a concentration of the metallic wire-free electrically conductive materials in the curable film composition, such as the metal-coated particles, metal particles, metal flakes, and/or metal nanoparticles, is greater than about 30 wt. %, for example, about 39 wt. % to 65 wt. %, on the basis of the total weight of the curable film composition. In some embodiments, the metallic wire-free electrically conductive materials, such as the metal-coated particles, metal particles, metal flakes, and/or metal nanoparticles, are uniformly distributed throughout a curable film composition of the present disclosure, which is then formed into a curable film, thereby providing an exterior surface protective layer of the present disclosure.

In other embodiments, the exterior surface protective layer of the present disclosure includes a first curable film, a second curable film; and an electrically conductive material including the metallic wire-free electrically conductive materials wherein the metallic electrically conductive material is disposed between the first and second curable films. In these embodiments, the metallic wire-free electrically conductive materials, such as the metal-coated particles, metal particles, metal flakes, and/or metal nanoparticles, are not incorporated into the present curable film compositions, but instead are formed into an electrically conductive layer on a surface of a first curable film. In some embodiments, a second curable film is then positioned on the electrically conductive layer formed from the metallic wire-free electrically conductive materials.

In some embodiments, at least a third curable film may be adjacently layered on the least one curable film. In other embodiments, at least a third curable film may be adjacently layered on a first curable film.

In other embodiments, the wire-free electrically conductive materials of the present disclosure do not include metals. Examples of suitable conductive non-metals include conductive carbon black, graphite, antimony oxide, ICPs as described herein and combinations thereof.

The morphology of the non-metal conductive materials may be in the form of particles coated with conductive non-metals, such as ICPs or carbon black, which may, for example, be coated onto non-conductive polymers, non-metal particles and/or non-metal flakes. In some embodiments, a largest mean dimension of such non-metal electrically conductive materials is greater than 1 micron, e.g., 1 micron to 250 microns, such as 10 microns to 100 microns, such as 50 microns to 200 microns.

In some embodiments, the morphology of the non-metal electrically conductive materials may be in the form of nanomaterials, such as nanotubes or nanoparticles. The largest mean diameter of such nanomaterials may be less than about 100 nanometers, such as about 1 to about 80 nanometers, such as about 10 to about 50 nanometers.

In some embodiments, the non-metal electrically conductive materials are carbon nanotubes. Carbon nanotubes may include single-walled carbon nanotubes (SWNTs), double-walled carbon nanotubes (DNTs), and multi-walled carbon nanotubes (MWNTs). The carbon nanotubes, optionally, may also be surface functionalized. Examples of functional groups that may be employed for functionalization may include hydroxy, epoxy, and amine functional groups.

In some embodiments, a concentration of the non-metal wire-free electrically conductive materials in the curable film composition, such as the ICP-coated particles, non-metal particles, non-metal flakes, and/or non-metal nanoparticles as described herein, is greater than about 30 wt. %, for example, about 39 wt. % to 65 wt. %, on the basis of the total weight of the curable film composition. In some embodiments, the non-metal wire-free electrically conductive materials, such as the ICP-coated particles, non-metal particles, non-metal flakes, and/or non-metal nanomaterials described herein, are uniformly distributed throughout a curable film composition of the present disclosure, which is then formed into a curable film, thereby providing an exterior surface protective layer of the present disclosure.

In other embodiments, the exterior surface protective layer of the present disclosure includes a first curable film, a second curable film; and a non-metal electrically conductive material including the non-metal wire-free electrically conductive materials formed into a layer, wherein the electrically conductive layer is disposed between the first and second curable films. In these embodiments, the non-metal wire-free electrically conductive materials, such as the ICP-coated particles, non-metal particles, non-metal flakes, and/or non-metal nanomaterials, are not incorporated into the present curable film compositions, but instead are formed into an electrically conductive layer on a surface of a first curable film. In some embodiments, a second curable film is then positioned on the electrically conductive layer formed from the non-metal wire-free electrically conductive materials.

In some embodiments, at least a third curable film may be adjacently layered on the least one curable film. In other embodiments, at least a third curable film may be adjacently layered on a first curable film.

In some embodiments the electrically conductive materials of the present disclosure include a conductive polymer weave. The present conductive polymer weaves may be wire free or include wires. In some embodiments, the present conductive polymer weaves include conductive fibers and optionally non-conductive fibers. In some embodiments, the conductive fibers of the present conductive polymer weave comprise non-metal conductive fibers or metallic fibers. As used herein, a "fiber" encompasses a single filament or fibers obtained from multiple filaments. A "filament" as used herein refers to a single strand of material. The term "weave" as used herein refers to many fibers plaited, knitted, braided, or woven to make a textile.

Fibers may take the form of tows, bundles, sheets, plies, and combinations thereof. Fibers may adopt non-woven, woven, knitted, stitched, wound, and braided configurations. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, and less than about 125000 filaments.

In some embodiments, the conductive fibers comprise non-metal conductive fibers comprising carbon black or more typically, ICPs. ICPs are also known as "synthetic metals" because they have electrical, magnetic, and optical properties typical of metals and semiconductors. In some embodiments, the ICPs of the present conductive polymer weaves have high conductivity, e.g. $10^5$ Siemens/centimeter (S/cm) to $10^7$ S/cm, such as $10^6$ S/cm to $10^7$ S/cm. ICPs are composed of macromolecules having fully conjugated sequences of double bonds along the chains. ICPs are known in the art and are described, for example, in U.S. Pat. No. 6,228,492, which is herein incorporated by reference in its entirety.

In some embodiments, the conductive polymer fibers are produced from ICPs comprising polyacetylene, polyaniline, polycarbazole, polyfuran, polyheteroarylenevinylene, in which the heteroarylene group is thiophene, furan or pyrrole; polyisothionaphene, polyparaphenylene, polyparaphenylene sulphide, polyparaphenylene vinylene, polyperinaphthalene, polyphthalocyanine, polypyrrole, polyquinoline, polythiophene and combinations thereof. Useful ICP's also include mixtures, copolymers, and derivatives of the aforesaid polymers, e.g., in which the monomer components have substituted side chains or groups. Typically, the ICPs used with the present conductive polymer weaves include polypyrrole, polycarbazole, polyaniline, polyacetylene, polythiophene and combinations thereof.

In other embodiments the conductive fibers include metallic fibers. In some embodiments, the metallic fibers have a conductivity ranging from $10^5$ S/cm to $10^7$ S/cm, $10^6$ S/cm to $10^7$ S/cm such as about $1.0 \times 10^7$ S/cm to about $7.0 \times 10^7$ S/cm, such as $5.98 \times 10^7$ S/cm to $6.30 \times 10^7$ S/cm. The metallic fibers may be developed from metals or metal alloys including phosphor bronze, aluminum, nickel coated copper, stainless steel, copper, silver and nickel. Typically, copper, silver and/or nickel are used. In some embodiments, the metallic fibers include thin metal filaments with a diameter ranging from about 1 μm to about 80 μm, which may be produced by methods known in the art, such as those described in Meoli et al., 2002, *Journal of Textile and Apparel, Technology and Management*, 2, 12 pages, which is herein incorporated by reference in its entirety.

In some embodiments, the non-metallic conductive fibers and/or the metallic fibers are composite materials prepared by coating a non-conductive filament with e.g., carbon black, ICPs, metal, an alloy thereof or combinations thereof. The coated filament may then be combined with other extruded filaments to form a filament bundle which may be processed into a fiber.

In some embodiments, the non-conductive filaments coated with a non-metallic or metallic electrically conductive material is a non-conductive fiber-forming polymer. The non-conductive fiber-forming polymers may include, for example, cellulose (including cellulose acetate, cellulose triacetate and viscous cellulose), polyacrylonitrile, polyamides, polyesters, polyolefins, polyurethanes, polyvinyl alcohols, polyvinyl chloride, co-polymers thereof, and blends comprising such polymers. Typical polymers for forming fibers include polyamides, polyesters such as polyethylene terephthalate, polybutylene terephthalate, and polypropylenes.

The filament components of the fiber may be extruded by any spinning process suitable for the manufacture of fibers from a particular polymer, including, for example, melt spinning, reaction spinning, plasticized-melt spinning, tack spinning, wet spinning, dispersion spinning, dry-spinning, dry-jet wet spinning or air-gap spinning, emulsion spinning, gel spinning, grid spinning, reaction spinning and the like. In general, these spinning processes comprise forcing a polymer melt or solution through multiple holes in a spinneret to generate liquid polymer streams that solidify into filaments which are ultimately combined together into a fiber.

The filaments, prepared by the spinning process described above, for example, may then be coated with e.g., ICP. Methods of forming coated filaments such as ICP-coated filaments are known in the art. See for example, U.S. Pat. No. 6,228,492, which describes the preparation of ICP-coated filaments and is herein incorporated by reference in its entirety.

To apply metallic coatings, art-known methods may be used, such as sputtering, vacuum deposition, electroless plating, carbonizing, and filling or loading fibers. High conductivities similar to those of metals ($10^6$ S/cm to $10^7$ S/cm) can be achieved with these methods.

In some embodiments, non-metallic and/or metallic conductive fibers as described herein are, for example, interwoven with non-conductive polymeric fibers to form a conductive polymer weave of the present disclosure. In some embodiments, the non-conductive fibers include a non-conductive polymer. Examples of non-conductive polymers that maybe used to form non-conductive fibers for, e.g., interweaving with the conductive fibers, include polyester, polyethylene terephalate, polyethylene, polyethylene naphthalate, polypropylene and combinations thereof.

The conductive and non-conductive fibers can be used in the manufacturing of a conductive polymer weave by plaiting, knitting, braiding, or interweaving processes. If conductive fibers are e.g., woven, with non-conductive fibers in a controlled pattern, the resulting textile comprises both conductive and nonconductive regions.

In some embodiments, the exterior surface protective layer of the present disclosure includes a first curable film, a second curable film and an electrically conductive material, wherein the electrically conductive material is an electrically conductive layer including a conductive polymer weave. In some embodiments, the electrically conductive layer is disposed between the first and second curable films. In some embodiments, at least a third curable film may be adjacently layered on the first curable film.

In some embodiments, the exterior surface protective layer of the present disclosure ranges in thickness from about 0.075 mm to about 0.5 mm, such as about 0.075 mm to about 0.15 mm, such as about 0.075 mm to about 0.1 mm.

In some embodiments, the first and second curable films are the same thickness. In other embodiments, the first and second curable films each independently have a thickness ranging from 0.05 mm to 0.33 mm, such as about 0.05 mm to about 0.1 mm, such as about 0.05 mm to about 0.66 mm.

The electrical conductivity of the exterior surface protective layer, achieved by combining the curable film compositions of the present disclosure with the electrically conductive materials described herein, may, unexpectedly, reduce the need for the use of relatively heavy metal screens, for example. Thus, the present exterior surface protective layer provides sufficient electrical conductivity for lightning strike protection, while also providing an exterior surface protective layer with reduced weight. For example, a weight savings of about 50 to 80% may be achieved as compared to an exterior surface protective layer embedded with metal screens. Moreover, in some embodiments, the exterior surface protective layer does require finish layers, e.g. primers and/or a paint topcoat, thus achieving further weight savings.

More particularly, in certain embodiments, the weight of the exterior surface protective layer may range from about 0.02 lbs/sqft to about 0.1 lbs/sqft, such as about 0.02 lbs/sqft to about 0.8 lbs/sqft or such as about 0.02 lbs/sqft to about 0.04 lbs/sqft.

Figure 1:
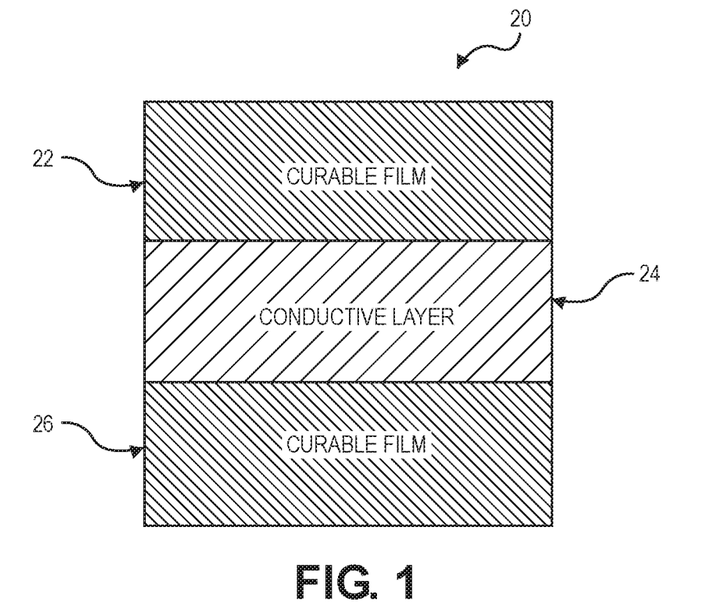
FIG. 1 depicts an embodiment of an exterior surface protective layer as described in the detailed description.

An embodiment of the exterior surface protective layer of the present disclosure is depicted in FIG. 1. The exterior surface protective layer 20 includes a first curable film 22 and a second curable film 26. As depicted in the figure, an electrically conductive layer 24 is sandwiched between the first and second curable films. The exterior surface protective layer may subsequently be adheredly disposed on a composite material as described herein below.

Composites

In some embodiments, the exterior surface protective layer is positioned onto a surface of a composite material. Typically, the exterior surface protective layer is positioned on the composite material surface that is to be exposed to environmental conditions. Positioning may be accomplished by manual or automated mechanisms (e.g., automatic tape layup (ATL), automatic fiber placement (AFP)).

In some embodiments, the composite materials are formed from an organic matrix and fibers, such as an epoxy resin and Carbon Fiber Reinforced Plastic (CFRP). In some embodiments, the composite material is in the form of a prepreg. The term "prepreg", as used herein, refers to one or more sheets or lamina of fibers that have been impregnated with a matrix material. The matrix may be present in a partially cured state to exhibit a selected stickiness or tack, for example.

In some embodiments, the prepreg layers are placed adjacent to one another. In certain embodiments, the prepreg layers within a layup may be positioned in a selected orientation with respect to one another. For example, prepreg layups may comprise prepreg layers having unidirectional fiber architectures, with the fibers oriented at 0°, 90°, a selected angle θ, and combinations thereof, with respect to the largest dimension of the layup, such as the length. It may be further understood that, in certain embodiments, prepregs having any combination of fiber architectures, such as unidirectional and multi-dimensional, may be combined to form the prepreg layup.

In some embodiments, the prepreg layup is in a mold and the exterior surface protective layer is positioned on the surface of the composite material and co-cured. The co-curing typically results in the incorporation of the exterior surface protective layer into the composite material. In some embodiments, the co-curing comprises baking the exterior surface protective layer and the composite material at a temperature ranging from about 121° C. to about 200° C., such as about 121° C. to about 130° C.

In some embodiments, co-curing is accomplished by the use of an autoclave, oven curing, such as microwave curing, or out of the autoclave curing. "Out of the autoclave", as used herein, is a process whereby a prepreg layup including, for example, an exterior surface protective layer of the present disclosure is within a closed mold. Vacuum, pressure and heat are then applied using art-known means other than an autoclave, e.g., a resin transfer molding press.

Figure 2:
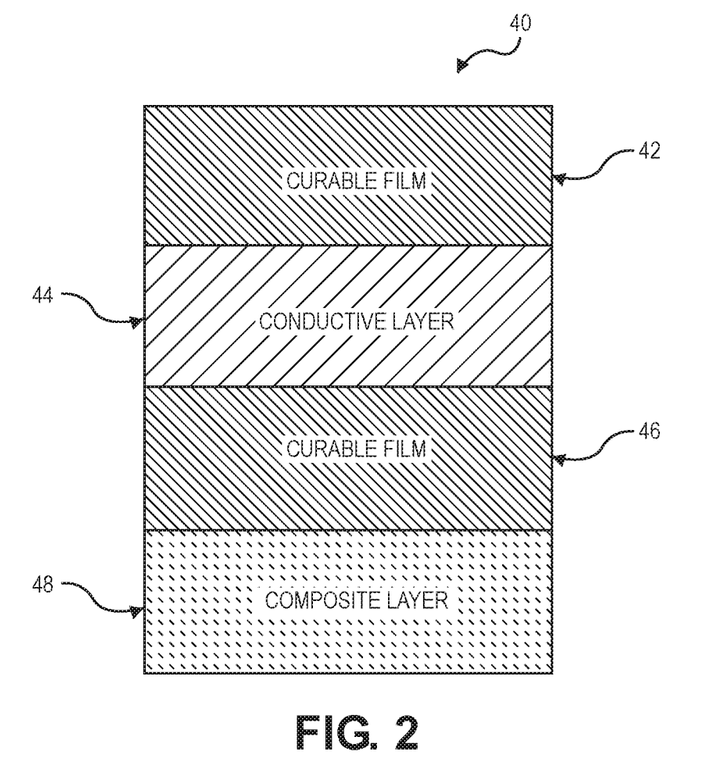
FIG. 2 depicts an embodiment of an exterior surface protected composite structure as described in the detailed description.

FIG. 2 is a side close-up cross-sectional view of an embodiment of an exterior surface protected composite structure 40 in accordance with the present disclosure. In this embodiment, the exterior surface protected layer includes a first curable film 42, a second curable film 46 and an electrically conductive layer 44, such as a conductive polymer weave, which is adheredly disposed between the first 42 and second 46 curable films. The exterior surface protected layer is adheredly disposed over the composite layer 48.

Figure 3:
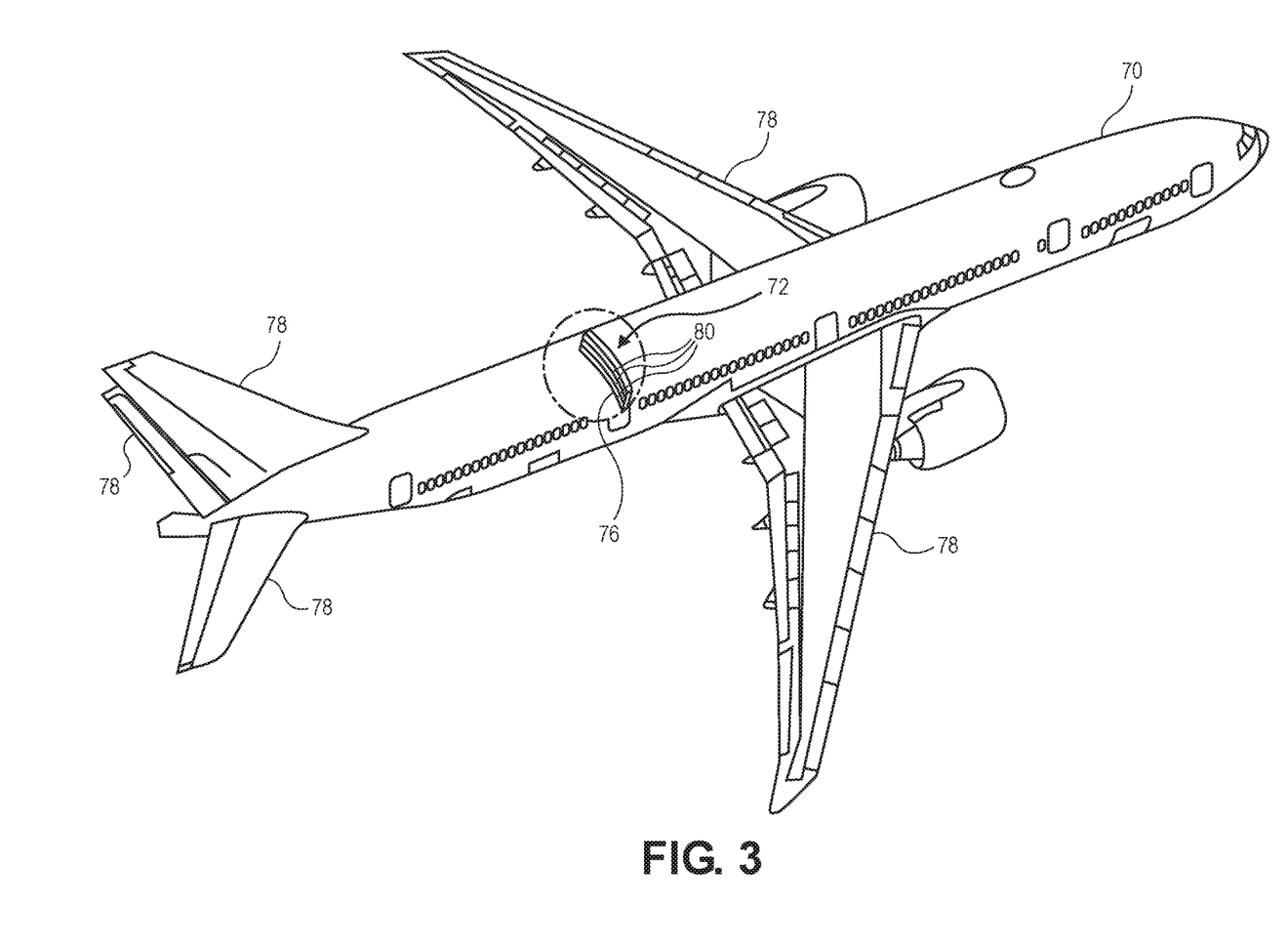
FIG. 3 depicts an embodiment of an aircraft including an exterior surface protected composite structure as described in the detailed description.

The composite structure of the exterior surface protected composite structure may form an inner portion of an aircraft part as indicated in FIG. 3. More particularly, FIG. 3 depicts a perspective view of an aircraft 70 incorporating an exterior surface protected composite structure 72. The exterior surface protected composite structure 72 is incorporated into an aircraft part(s), such as the fuselage 76, tail 78 and/or wings 78 of the aircraft 70. The exterior surface protected composite structure 72 is oriented such that the composite structure of the exterior surface protected composite structure 72 forms the inner portion of the fuselage 76 and the exterior surface protective layer 80 is the outermost layer, which is exposed to environmental conditions.

In some embodiments, the exterior surface protective layer, such as embodiment 80 depicted in FIG. 3, not only serves as a lightning strike protectant, but also mitigates the effects of environmental conditions, such as chemicals or solar radiation, e.g., ultraviolet (UV) radiation. For example, in the absence of an exterior surface protective layer, a surface of a composite structure exposed to environmental conditions may be exposed to, e.g., chemicals in the environment, such as battery acid, which may result in corrosion of the composite structure. In some embodiments, the present exterior surface protective layer is resistant to such chemicals. For example, in some embodiments, corrosion of the composite structure comprising the exterior surface protected layer of the present disclosure is decreased, in comparison to the corrosion of a composite structure in the absence of the present exterior surface protective layer.

Further, a composite structure may degrade due to exposure to solar radiation, such as UV radiation. However, in some embodiments, a composite structure comprising the exterior surface protected layer of the present disclosure has a UV resistance ranging from about 200 nanometers to about 800 nanometers, such as about 200 nanometers to about 400 nanometers.

In other embodiments, the exterior surface layer demonstrates a resistance to chemicals such as hydraulic jet fuel, which may result in a softening of conventional exterior surface protective layers, subsequently resulting in e.g., degradation of the composite structure. In contrast, in some embodiments, the exterior surface protective layer of the present disclosure may be resistant to softening after at least thirty days of exposure, such as at least two months of exposure, such as at least six months or more of exposure to about one year.

Moreover, in some embodiments, the reduction of corrosion and degradation may be accomplished without the need for finish, e.g., primer and topcoat layers. As is known in the art, a primer, which is the foundation of a finish, may be bound to a surface to inhibit corrosion. As is also known in the art, a topcoat finish may be further applied to a lightning strike material to further protect exposed surfaces from corrosion and degradation. However, use of the present exterior surface protective layer, which can mitigate such deterioration, may enable such additional coatings to be avoided, not only lowering labor costs, but also decreasing the weight of a lightning strike protectant.

Methods

In another aspect, the present disclosure is directed to a method of forming an exterior surface protected composite structure. In some embodiments, the exterior surface protective layer, as described herein, is positioned onto a surface of a composite material as also herein described. As described in the present disclosure, an exterior surface protective layer may be positioned onto a surface of a composite material exposed to environmental conditions. The exterior surface protective layer and the surface of a composite material may be co-cured, as described, to form a cured exterior surface protected structure.

In some embodiments, the co-curing comprises baking the exterior surface protective layer and the composite structure at a temperature ranging from about 121° C. to about 200° C. as described herein. Typically, the co-curing comprises autoclaving the exterior surface protective and the composite material. In other embodiments, co-curing is performed using an oven, such as microwave oven or an out-of-the-autoclave process as described in the present disclosure.

Example

Prophetic

A thermosetting composition for use in a curable film of the present disclosure is prepared by reacting a mixture of polyisocyanate and polyol. In particular, the components are added to a mixing vessel and mixed using a high speed shear lab mixer for about 30 minutes at 1000 rpm. A solvent, such as MEK, is added to the resins to adjust the rheology and solid content of the composition, as necessary.

Optionally, elastomer tougheners, such as Nipol 1472 (Zeon Chemical, Inc.) are subsequently added to the resins, along with an optional flow control agent, such as amorphous fumed silica, UV stabilizers BHT and 2-hydroxy-4-methoxy-benzophenone. MEK solvent is added, as necessary, to control viscosity. The composition is then mixed for about 50-70 minutes at about 1000-3000 rpm. The temperature of the composition is typically kept below about 70° C. The mixture, typically, is subsequently cooled to below about 50° C. and curing agents are added. The temperature of the mixture, during addition of the curing agents, is maintained below about 55° C.

To form surfacing films, the composition is deposited as a film and dried. A layer of silver nanoparticles is then deposited onto a surface of one curable film and a second curable film is then positioned onto the layer of silver nanoparticles, thus forming an exterior protective layer.

The exterior protective layer is then positioned onto 6 plies of prepregs, for example, each formed from an epoxy resin and carbon fiber reinforced plastic with the exterior protective layer as the outermost layer. The layups and exterior surface protective layer are then co-cured in an autoclave to incorporate the exterior surface protective layer within the composite to form a composite testing panel.

Lightning direct effect tests are employed to evaluate the performance of the composite testing panel used within different zones of aircraft. The lightning strike tests are performed in accordance with RTCA/DO-160F, "Environmental Conditions and Test Procedures for Airborne Equipment" of the Radio Technical Commission for Aeronautics. In brief, a surfacing film/laminate composite testing panel is placed in electrical contact with current return elements. An electrode is positioned at about the center and adjacent the test panel. An initiating wire is extended from the electrode to the incipient lightning strike point on the sample surface.

Tests are conducted to simulate a lightning strike upon Zone IA of an aircraft, the radome, and Zone 2A of an aircraft, most of the fuselage sections. The tests simulate lighting strikes by subjecting the test panels to high current test waveforms. In general, the exterior surface protected composite structure of the present disclosure exhibits comparable lighting strike protection to the performance of a control panel having an interwoven wire fabric. Furthermore, surface damage of the present exterior surface protected composite structure of the present disclosure is very limited.

We claim:

1. An exterior surface protective layer for protecting a composite structure from environmental conditions, said exterior surface protective layer comprising:
at least first and second curable film layers; and
a wire-free electrically conductive layer,
wherein each of the at least first and second curable film layers independently comprises at least one of polyurethane, polyimide, and polyester upon curing,
wherein the wire-free electrically conductive layer is selected from the group consisting of a nanomaterial and an electrically conductive polymer weave comprising non-metallic conductive fibers and/or metallic fibers, wherein the non-metallic conductive fibers and/or the metallic fibers of the electrically conductive polymer weave are not composite materials prepared by coating non-conductive filaments, and
wherein a weight of the exterior surface protective layer ranges from about 0.02 pounds per square foot to about 0.1 pounds per square foot,
wherein the wire-free electrically conductive layer is disposed between the first and second curable film layers,
wherein electrically conductive materials are not incorporated into the first and second curable film layers,
wherein the first and second curable film layers do not comprise epoxy, and
wherein the first and second curable film layers each independently have a thickness ranging from 0.05 millimeters to 0.33 millimeters.

2. The exterior surface protective layer of claim 1, wherein the first and second curable film layers comprise polyurethane upon curing.

3. The exterior surface protective layer of claim 1, wherein the electrically conductive polymer weave comprises the metallic fibers.

4. The exterior surface protective layer of claim 1, wherein the non-metallic conductive fibers and/or metallic fibers of the electrically conductive polymer weave are selected from the group consisting of copper fibers, nickel fibers, silver fibers, intrinsically conductive polymer fibers, and combinations thereof.

5. The exterior surface protective layer of claim 1, wherein the wire-free electrically conductive layer is the electrically conductive polymer weave.

6. The exterior surface protective layer of claim 5, wherein the first and second curable film layers comprise polyurethane.

7. The exterior surface protective layer of claim 1, wherein the exterior surface protected layer does not comprise at least one finish layer selected from at least one of a primer and a paint topcoat.

8. The exterior surface protective layer of claim 1, wherein the weight of the exterior surface protective layer ranges from about 0.02 pounds per square foot to about 0.04 pounds per square foot.

9. The exterior surface protective layer of claim 1, wherein the nanomaterial is a non-metal selected from the group consisting of carbon black, graphite, antimony oxide and combinations thereof.

10. The exterior surface protective layer of claim 1, wherein the wire-free electrically conductive layer consists of the nanomaterial.

11. The exterior surface protective layer of claim 10, wherein the nanomaterial is carbon nanotubes.

12. The exterior surface protective layer of claim 10, wherein the nanomaterial is nanoparticles.

13. The exterior surface protective layer of claim 12, wherein the nanoparticles are selected from the group consisting of silver nanoparticles, gold nanoparticles, nickel nanoparticles, aluminum nanoparticles, copper nanoparticles, alloys thereof and mixtures thereof.

14. The exterior surface protective layer of claim 12, wherein the nanoparticles are silver nanoparticles.

15. An exterior surface protected composite structure comprising:
- a composite structure, wherein the composite structure comprises a surface that may be exposed to environmental conditions; and
- an exterior surface protective layer, wherein the exterior surface protective layer is adhered to the composite structure surface exposed to the environmental conditions,
  - wherein the exterior surface protective layer comprises:
  - at least first and second curable film layers; and
  - a wire-free electrically conductive layer,
- wherein each of the at least first and second curable film layers independently comprises at least one of polyurethane, polyimide, and polyester upon curing,
- wherein the wire-free electrically conductive layer is selected from the group consisting of a nanomaterial and an electrically conductive polymer weave comprising non-metallic conductive fibers and/or metallic fibers, wherein the non-metallic conductive fibers and/or the metallic fibers of the electrically conductive polymer weave are not composite materials prepared by coating a non-conductive filaments, and
- wherein a weight of the exterior surface protective layer ranges from about 0.02 pounds per square foot to about 0.1 pounds per square foot,
- wherein the wire-free electrically conductive layer is disposed between the first and second curable film layers,
- wherein electrically conductive materials are not incorporated into the first and second curable film layers,
- wherein the first and second curable film layers do not comprise epoxy, and
- wherein the first and second curable film layers each independently have a thickness ranging from 0.05 millimeters to 0.33 millimeters.

16. The exterior surface protected composite structure of claim 15,
- wherein the wire-free electrically conductive layer is the electrically conductive polymer weave.

17. The exterior surface protected composite structure of claim 15, wherein the non-metallic conductive fibers and/or metallic fibers of the electrically conductive polymer weave are selected from the group consisting of copper fibers, nickel fibers, silver fibers, intrinsically conductive polymer fibers, and combinations thereof.

18. The exterior surface protected composite structure of claim 15, wherein the first and second cured film layers comprise polyurethane.

19. The exterior surface protected composite structure of claim 15, wherein the exterior surface protected composite structure does not comprise at least one finish layer selected from at least one of a primer and a paint topcoat.

20. The exterior surface protected composite structure of claim 15, wherein the environmental conditions comprise lightning strikes.

21. The exterior surface protected composite structure of claim 15,
- wherein the exterior surface protective layer decreases corrosion of the composite structure in comparison to the corrosion of a composite structure in the absence of the adhered exterior surface protective layer,
- wherein the exterior surface protective layer resists softening due to hydraulic jet fuel for at least thirty days or
- wherein the exterior surface protective layer comprises a UV resistance ranging from about 200 nanometers to about 800 nanometers.

22. An aircraft part comprising the exterior surface protected composite structure of claim 15.

23. The aircraft part of claim 22, wherein the aircraft part is selected from at least one of a fuselage, a tail and a wing of an aircraft.

24. A method of forming an exterior surface protected composite structure comprising:
- positioning an exterior surface protective layer onto a surface of a composite material,
  - wherein the exterior surface protective layer comprises:
  - at least first and second curable film layers and
  - a wire-free electrically conductive layer,
- co-curing the exterior surface protective layer and the composite material to form a cured exterior surface protected structure,
- wherein each of the at least first and second curable film layers independently comprises at least one of polyurethane, polyimide, and polyester upon curing,
- wherein the wire-free electrically conductive layer is selected from the group consisting of a nanomaterial and an electrically conductive polymer weave comprising non-metallic conductive fibers and/or metallic fibers, wherein the non-metallic conductive fibers and/or the metallic fibers of the electrically conductive polymer weave are not composite materials prepared by coating a non-conductive filaments,
- wherein a weight of the exterior surface protective layer ranges from about 0.02 pounds per square foot to about 0.1 pounds per square foot,
- wherein the wire-free electrically conductive layer is disposed between the first and second curable film layers,
- wherein electrically conductive materials are not incorporated into the first and second curable film layers, and
- wherein the first and second curable film layers do not comprise epoxy,
- wherein the exterior surface protective layer may be exposed to environmental conditions, and
- wherein the first and second curable film layers each independently have a thickness ranging from 0.05 millimeters to 0.33 millimeters.

25. The method of claim 24,
- wherein the wire-free electrically conductive layer is the electrically conductive polymer weave.

26. The method of claim 24, wherein said co-curing comprises baking the exterior surface protective layer and the composite material at a temperature ranging from about 121° C. to 200° C.

27. The method of claim 24, wherein the co-curing comprises autoclaving the exterior surface protective layer and the composite material.

* * * * *